(12) United States Patent
Demisse et al.

(10) Patent No.: US 10,789,837 B2
(45) Date of Patent: *Sep. 29, 2020

(54) VEHICLE IDENTIFICATION SYSTEM AND METHOD

(71) Applicant: RideShare Displays, Inc., Fairfield, NJ (US)

(72) Inventors: Dereje M. Demisse, Los Angeles, CA (US); Steve Rose, Roseland, NJ (US)

(73) Assignee: RideShare Display, Inc., Fairfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/670,132

(22) Filed: Oct. 31, 2019

(65) Prior Publication Data
US 2020/0074849 A1 Mar. 5, 2020

Related U.S. Application Data

(63) Continuation of application No. 16/372,039, filed on Apr. 1, 2019, now Pat. No. 10,467,896, which is a continuation-in-part of application No. 15/910,196, filed on Mar. 2, 2018, now Pat. No. 10,249,184, which is a continuation-in-part of application No. 15/860,939, filed on Jan. 3, 2018, now Pat. No. 10,169,987, which is a continuation of application No. 14/723,049, filed on May 27, 2015, now Pat. No. 9,892,637.

(60) Provisional application No. 62/004,753, filed on May 29, 2014.

(51) Int. Cl.
*G08G 1/017* (2006.01)

(52) U.S. Cl.
CPC .................................. *G08G 1/017* (2013.01)

(58) Field of Classification Search
CPC ....................................................... G08G 1/017
USPC ................... 340/425.5, 426.1, 539.1, 539.11
See application file for complete search history.

(56) References Cited

U.S. PATENT DOCUMENTS

| | | | |
|---|---|---|---|
| 5,777,565 A * | 7/1998 | Hayashi ............... | G07B 15/063 340/928 |
| 5,896,554 A * | 4/1999 | Itoh ....................... | H04H 20/57 455/2.01 |
| 5,928,294 A * | 7/1999 | Zelinkovsky ........ | G05D 1/0265 180/168 |
| 6,098,048 A * | 8/2000 | Dashefsky ............ | G06Q 30/02 340/438 |
| 6,356,838 B1 | 3/2002 | Paul | |
| 6,615,046 B1 | 9/2003 | Ur | |

(Continued)

*Primary Examiner* — Daryl C Pope
(74) *Attorney, Agent, or Firm* — Welsh Flaxman & Gitler LLC

(57) ABSTRACT

A vehicle identification system includes one or more displays associated with a vehicle, and a network-accessible controller. The one or more displays are located to be visible from an exterior of the vehicle. The controller is adapted to generate a first signal with an identifier to be transmitted to a mobile communication device associated with a vehicle or its driver in response to a ride request from a user. The mobile communication device associated with the vehicle or its driver is adapted to generate a second signal indicative of the identified to be transmitted to one or more displays. The controller is also adapted to generate a further signal for displaying an advertisement on the one or more displays.

20 Claims, 6 Drawing Sheets

(56) References Cited

U.S. PATENT DOCUMENTS

| | | |
|---|---|---|
| 6,756,913 B1 | 6/2004 | Ayed |
| 8,635,556 B2 | 1/2014 | Lalanette et al. |
| 9,488,494 B2 | 11/2016 | Millspaugh |
| 9,718,397 B2 | 8/2017 | Kalanick et al. |
| 9,892,637 B2 | 2/2018 | Demisse |
| 10,169,987 B1 | 1/2019 | Demisse |
| 10,249,184 B2 | 4/2019 | Demisse et al. |
| 10,467,896 B2* | 11/2019 | Demisse ................ G08G 1/017 |
| 2003/0065556 A1 | 4/2003 | Takanashi et al. |
| 2003/0065566 A1 | 4/2003 | Kodaka et al. |
| 2004/0076280 A1 | 4/2004 | Ando et al. |
| 2004/0177109 A1 | 9/2004 | Lee |
| 2005/0012598 A1 | 1/2005 | Berquist |
| 2012/0203599 A1 | 8/2012 | Choi et al. |
| 2015/0220992 A1 | 8/2015 | Brown et al. |
| 2015/0363829 A1 | 12/2015 | Landers |
| 2019/0009721 A1 | 1/2019 | Schofield et al. |

* cited by examiner

VEHICLE IDENTIFICATION SYSTEM AND METHOD

STATEMENT RE: FEDERALLY SPONSORED RESEARCH/DEVELOPMENT

Not Applicable

BACKGROUND

1. Technical Field

The present disclosure relates generally to a system and method for vehicle identification. More particularly, the present invention relates to a system adapted to provide an indicator on a mobile communication device of a user having requested a ride service to allow the user to identify a vehicle prior to boarding the vehicle.

2. Related Art

The rapid technological advances in the Internet, mobile communications technologies, and social networking have opened up opportunities for tech-enabled transportation services and transportation network companies ("TNC") that provide on-demand transportation. In one ride-hailing model, drivers and riders use mobile phones connected to a web service to arrange rides. Before riding with UBER, for example, customers are required to create an account with their personal and payment information, and rides can only be requested through the application.

To varying degrees, TNC's and on-demand transportation service providers employ ideas from social networking, reputation systems, and Global Positioning System (GPS) tracking to provide service. Although these companies may appear to be taxi companies to riders, they are actually dispatching services which serve both riders and drivers.

Technology-enabled transportation services, such as UBER and LYFT, may help to improve the public's transportation options. Expanding the availability of on-demand transportation modes and technology-enabled tools may give more people the freedom to live "car-free" or "car-light" lifestyles—avoiding the cost of owning, insuring, maintaining and garaging a private vehicle. Especially in view of those individuals who do not and/or are not able to drive.

There are numerous barriers that have prevented people from using non-driving modes of transportation. Public transportation use, for example is often limited by perceptions of personal security in public transportation travel. Rider safety is fundamental to the continued success of transportation services, but driver safety has also become an issue.

A continuing need exists for systems and methods adapted for use by transportation services to ensure rider and driver security.

BRIEF SUMMARY

According to an aspect of the present disclosure, vehicle identification systems and methods are provided. The vehicle identification system includes one or more displays associated with a vehicle, and a network-accessible controller. The one or more displays are located to be visible from an exterior of the vehicle. The controller is adapted to generate a first signal to be transmitted to a mobile communication device associated with a driver of the vehicle when it is determined that the vehicle is within a predetermined distance of a specific location.

The mobile communication device associated with the driver is adapted to generate a second signal to be transmitted to the one or more displays. The second signal represents an indicator. In addition, the controller is further adapted to receive an ad request signal from the mobile communication device associated with the driver, and transmit a response signal in response to the ad request signal.

According to another aspect of the present disclosure, a method of identifying a vehicle dispatched to a location of a user having requested a ride from a transportation service is provided. The method includes: when it is determined that the vehicle is within a predetermined distance of the location of the user, generating a notification signal to a mobile communication device associated with the driver; generating an indicatory signal representing an indicator in response to receiving the notification signal; and displaying, on a display associated with the vehicle, the indicator based on the notification signal. The display is located to be visible from the exterior of the vehicle. The method also includes: displaying the indicator on a mobile communication device associated with the user; and identifying the vehicle based on appearance of a match between the indicator being displayed on the mobile communication device associated with the user and the indicator being displayed on the display associated with the vehicle. The method also includes: receiving an ad request signal from the mobile communication device associated with the driver, and transmitting a response signal in response to the ad request signal.

BRIEF DESCRIPTION OF THE DRAWINGS

Objects and features of the presently-disclosed systems and methods for vehicle identification will become apparent to those of ordinary skill in the art when descriptions of various embodiments thereof are read with reference to the accompanying drawings, of which.

DETAILED DESCRIPTION

Figure 1A:
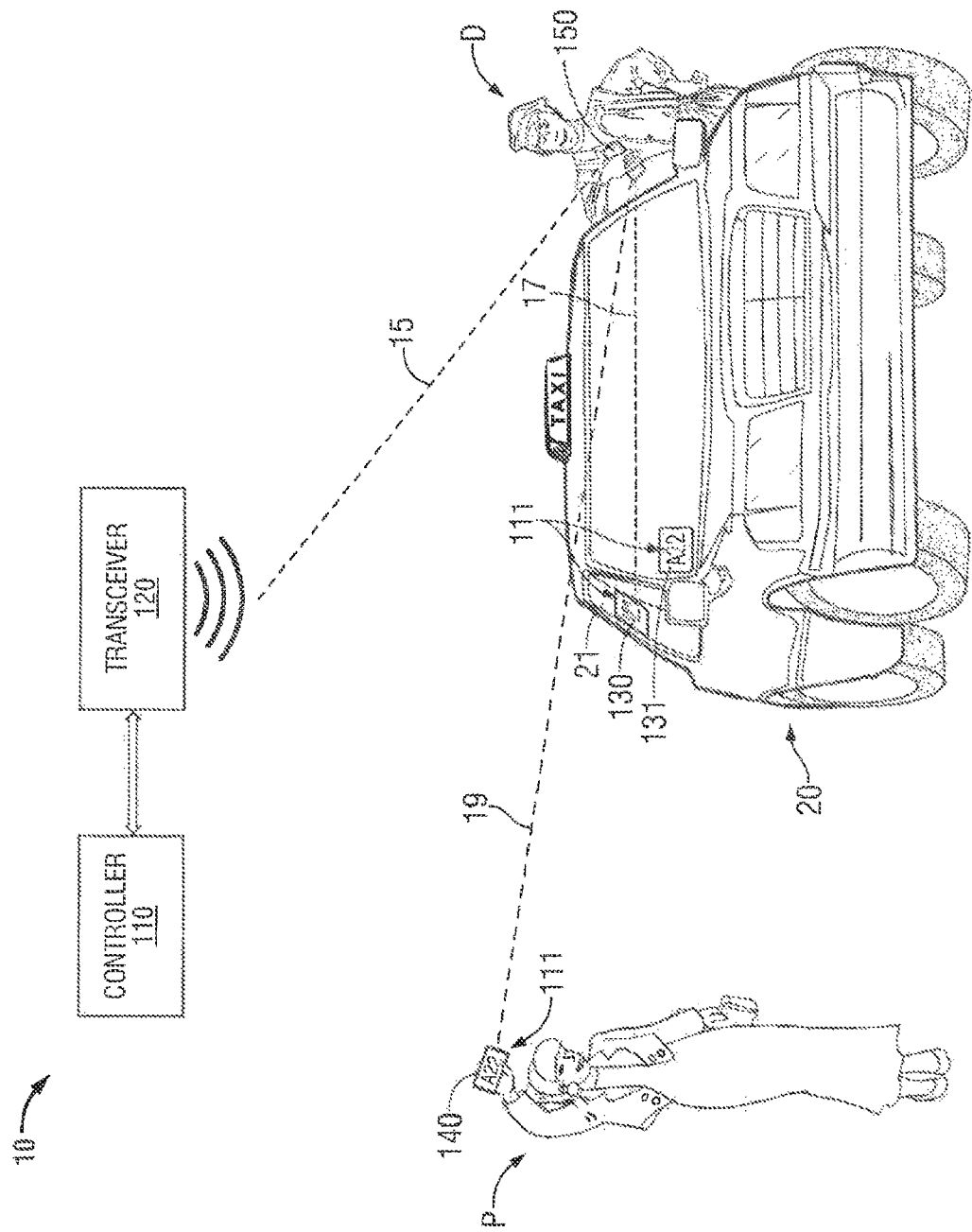
FIG. 1A is a diagrammatic illustration of an exemplary system for vehicle identification in accordance with an embodiment of the present disclosure.

Hereinafter, embodiments of a system and method for vehicle identification are described with reference to the accompanying drawings. Like reference numerals may refer to similar or identical elements throughout the description of the figures.

This description may use the phrases "in an embodiment," "in embodiments," "in some embodiments," or "in other embodiments," which may each refer to one or more of the same or different embodiments in accordance with the present disclosure.

As used herein, the term "controller" may include any type of computing device, computational circuit, or any type of processor or processing circuit capable of executing a series of instructions that are stored in a memory associated with the controller. As it is used herein, "mobile communication devices" generally refers to any portable wireless device. In one instance, the mobile communication device has one or more processors and memory capability.

Examples of mobile communications devices include, without limitation, cellular (cell) and mobile telephones, smart mobile telephones, mobile e-mail devices, digital personal assistances, wearable devices, etc.

Various embodiments of the present disclosure provide vehicle identification systems and methods adapted to provide an indicator on a mobile communication device of a user having requested a ride service to allow the user to identify a vehicle prior to boarding the vehicle. Various embodiments of the presently-disclosed vehicle identification systems and methods are adapted to provide a notification signal for activating a driver's mobile communication device or another mobile communication device associated with the vehicle to generate a signal representing an indicator, whereby the indicator is displayed on a display visible from the exterior of the vehicle. The indicator may additionally, or alternatively, be displayed on a display associated with an article of clothing (e.g., coat or hat) worn by the driver and/or displayed on a remote hand-held display device (e.g., tablet computer) held by the driver. The presently-disclosed vehicle identification systems and methods for vehicle identification may be used in coordination with services that use mobile fleets of vehicles or personnel in a variety of scenarios. Vehicle identification systems and methods described herein may be used in combination with chauffeured driving services, such as taxi cab providers, car sharing and car services (e.g., UBER, LYFT, FLYWHEEL), limo services, shuttles (e.g., airport-operated shuttle buses, door-to-door shuttles), police dispatch, package delivery services (e.g., UPS, FEDEX, couriers, drones), and/or mobile military units. Vehicle identification systems and methods described herein may be implemented, in whole or in part, as an application running as a standalone program or may be embedded into third-party applications, e.g., UBER, LYFT, etc. Embodiments of the presently-disclosed vehicle identification system can be implemented as software, hardware, firmware or any combination thereof. Where a component is implemented as software, it can be implemented as a standalone program, but can also be implemented in other ways, for example, as part of a larger program, as a plurality of separate programs, as a kernel loadable module, as one or more device drivers or as one or more statically or dynamically linked libraries. Those skilled in the art will readily appreciate that where the presently-disclosed vehicle identification system is implemented in whole or in part in software, the software components thereof may be stored on computer readable media as computer program products. Any form of computer readable medium may be used in this context, such as magnetic or optical storage media. Additionally, software portions of the present invention may be instantiated (for example as object code or executable images) within the memory of any programmable computing device.

FIG. 1A shows a vehicle identification system 10 in accordance with an embodiment of the present disclosure. The vehicle identification system 10 includes a controller 110, optionally a transceiver 120, and one or more displays associated with a motor vehicle 20. In the illustrative embodiment shown in FIG. 1A, a first display 130 is associated with a passenger side rear window 21 of a motor vehicle 20, and a second display 131 is associated with the front windshield of the motor vehicle 20. In some embodiments, the controller 110 may be a computer network controller or a server. In some embodiments, the controller 110 is communicatively coupled to the transceiver 120. The transceiver 120 may consist of one or more cell phone towers of a tower network. It is to be understood that the transceiver 120 may be any device capable of wireless communication with a mobile communication device associated with the vehicle 20 including, for example, a mobile communication device 150 associated with the driver D and/or mobile communication device disposed within the vehicle such as, for example, a WiFi hot spot communication device (not shown), as well as a mobile communication device 140 associated with a rider, such as the user P. For example, the transceiver 120 may consist of satellites instead of land-based cell towers.

The vehicle identification system 10 may be adapted to generate one or more signals representing an indicator, which may be displayable as a "code" (e.g., a text string or an alphanumeric string), an icon, or other identifier, on the display 130 and on a mobile communication device 140 associated with the user P to enable the user P to identify the vehicle that he/she has requested for a ride service. Although one display 130 is shown associated with a passenger side rear window 21 of the motor vehicle 20, it is to be understood that one or more displays 130 may be mounted on or otherwise associated with the front windshield, rear shield, passenger side front window, passenger side rear window, driver side rear window, and/or driver side front window of the ride-service vehicle. Those skilled in the art will readily appreciate that the display may be disposed on other areas of the vehicle, e.g., door and body panels. Display 130 may be operatively connected to a receiver. As described in more detail below, the vehicle identification system 10 may be adapted to generate a first signal that is transmitted via the transceiver 120 to a mobile communication device 150 associated with the driver, wherein, in response to receiving the first signal, an application on the mobile communication device 150 associated with the driver D generates a second signal 17 representing an indicator 111 that is transmitted to the display 130.

Figure 1B:
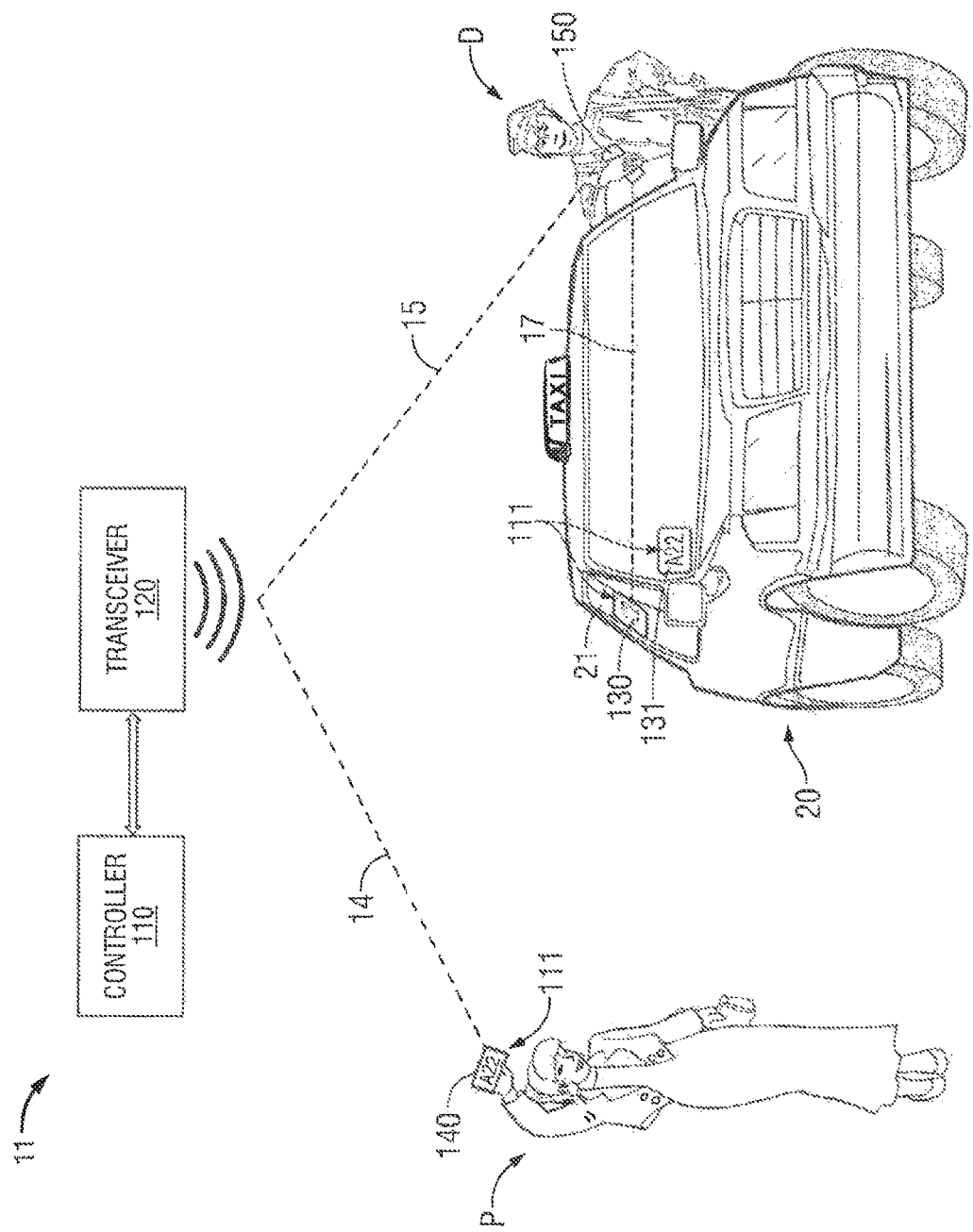
FIG. 1B is a diagrammatic illustration of an exemplary system for vehicle identification in accordance with another embodiment of the present disclosure.

It is to be understood that the dashed lines indicative of wireless links between various components of the vehicle identification system 10 shown in FIG. 1A and the vehicle identification system 11 shown in FIG. 1B are merely illustrative and non-limiting examples of wireless connections, and that vehicle identification system embodiments of the present disclosure may utilize many different configurations of wireless connections, some with additional, fewer, or different links than depicted in FIGS. 1A and 1B. For example, in some embodiments, the display 130 may be adapted to establish a wireless connection with a mobile communication device 140 associated with the user P.

A signal from a mobile communication device 140 of a user P may be provided to a taxi cab service, in order to have a taxi driver D dispatched to the location of the user P. A signal from a user's mobile communication device 140 may be provided to a car service, e.g., the UBER service, in order to have a driver from the service dispatched to the location of the user P. Those skilled in the art will readily appreciate that various different transportation services, e.g., UBER, LYFT, limos and any other kind of ride service, may be requested by the user P. Once a ride service has been requested by the user P, a request may be sent to the user P to download an application to the user's mobile communication device 140. The application may be adapted to receive an indicatory signal and display an indicator, as described in more detail below, and may provide other functionality, e.g., a panic button for sending to law enforcement and/or emergency services providers information related to the mobile communication device 140 including its location, information about the user P associated with the mobile communication device 140, and/or information recorded by the mobile communication device 140 during and subsequent to the time the panic button is activated. It is to be understood that although various components are illustrated and described above as separate entities, each illustrated component represents a collection of functionalities which can be implemented as software, hardware, firmware or any combination of these.

The controller 110 may generate a first signal (also referred to herein as a "notification signal") that is transmitted via the transceiver 120 to the mobile communication device associated with the vehicle including a mobile communication device installed within the vehicle or a mobile communication device 150 associated with the driver D. In some embodiments, the vehicle identification system 10 is adapted to generate a notification signal once the vehicle 20 approaches the pickup location, e.g., within a predetermined distance based on GPS location. Preferably, the predetermined distance is a suitable distance to provide the user P an opportunity to view the display 130 as the vehicle 20 approaches the pickup location. In an embodiment, the predetermined distance is approximately one quarter mile from the pickup location. In other embodiments, the vehicle identification system 10 may be adapted to generate a notification signal once the vehicle 20 arrives at the pickup location.

In some embodiments, in response to receiving the notification signal, an application on the mobile communication device 150 associated with the driver D generates a second signal 17 (also referred to herein as an "indicatory signal") representing an indicator. The indicatory signal 17 transmitted by the mobile communication device 150 may be received by the display 130 and/or a receiver operatively associated therewith. Responsive to receiving the indicatory signal 17, the display 130 displays the indicator 111. The indicatory signal 17 representative of indicator 111 transmitted by the driver's mobile communication device 150 may additionally, or alternatively, be received by the mobile communication device 140 associated with the user P. In some embodiments, as shown for example in FIG. 1A, a second indicatory signal 19 representative of the indicator 111 is transmitted by the driver's mobile communication device 150 to the mobile communication device 140 associated with the user P. Responsive to receiving the indicatory signal 19, the mobile communication device 140 displays the indicator 111.

FIG. 1B shows a vehicle identification system 11 in accordance with an embodiment of the present disclosure. The vehicle identification system 11 is similar to the vehicle identification system 10 shown in FIG. 1A, except for the configuration of the wireless links. As seen in FIG. 1B, vehicle identification system 11 is adapted to generate an indicatory signal 14 to be transmitted to the mobile communication device 140 associated with the user P and a notification signal 15 to be transmitted to the mobile communication device associated with the vehicle including, for example, the mobile communication device 150 associated with the driver D. In this embodiment the driver's mobile communication device 150 does not communicate with the user's mobile communication device 140, being an accommodation for users who prefer to communicate directly with the dispatching service, rather than the driver D.

In an illustrative example wherein a dispatched vehicle 20 arrives at the pickup location and waits for the user P who requested the ride service, the vehicle 20 may be parked by itself or parked among other similar and/or not similar vehicles. When the user P who requested the ride service approaches the pickup area, in order to locate his/her ride the user P need only visually observe a vehicle 20 with the display 130 displaying the indicator 111 that is a match to the indicator 111 (e.g., A22 shown in FIGS. 1A and 1B) being displayed on the user's mobile communication device 140. Once the user P has identified the vehicle 20, the user P may be requested to show the indicator 111 displayed on his/her mobile communication device 140 to the driver D, e.g., to allow the driver D to verify that he/she is picking up the person who actually requested the ride service. In an alternative embodiment, the controller 110 may generate the indicator upon receiving a signal indicative of a ride request independent of the distance of the vehicle 20 to the user P. The generated indicator, may be unique for a geographic region proximate the pickup location and/or for a corresponding period of time after receiving the signal indicative of a ride request or relative to a scheduled pickup time.

In some embodiments, the indicator 111 may be a "code" such as an alphanumeric string, e.g., A22, B11, C44, and so on. Preferably, the code would not be duplicated in the same pickup location. In some embodiments, when the driver D turns on the fare meter, the code (or other indicator) is deleted. If there is a need for the driver D to pick up another person, when the driver D approaches the second location (or third location, etc.), the vehicle identification system 10 may generate another notification signal. Alternatively, the vehicle identification system 10 may be adapted to allow the driver to enter a command on the driver's mobile communication device 150 so that another code (or other indicator) can be generated for the next rider who is going to share the same vehicle. In some embodiments, the vehicle identification system 10 may be adapted to allow the user P who originally requested the ride service that was picked up at the first location to text the code, or otherwise send the indicator, to another person who is going to share the ride.

It is to be understood that multiple drivers and vehicles may be dispatched to the same or different locations, e.g., concurrently or sequentially, and the vehicle identification system 10 (and/or the vehicle identification system 11) may generate any number of notification signals. In an illustrative embodiment of the vehicle identification system 10 shown in FIG. 3, four ride service requests VEHICLE REQUEST-A, VEHICLE REQUEST-B, VEHICLE REQUEST-C, and VEHICLE REQUEST-D are received from four users (also referred to herein as "riders") for pickup. The controller 110 generates four different notification signals, NOTIFICATION-A, NOTIFICATION-B, NOTIFICATION-C, and NOTIFICATION-D, to be transmitted by the transceiver 120 to a first DRIVER'S MOBILE DEVICE 150A, a second DRIVER'S MOBILE DEVICE 150B, a third DRIVER'S MOBILE DEVICE 150C, and a fourth DRIVER'S MOBILE DEVICE 150D, respectively.

Figure 2:
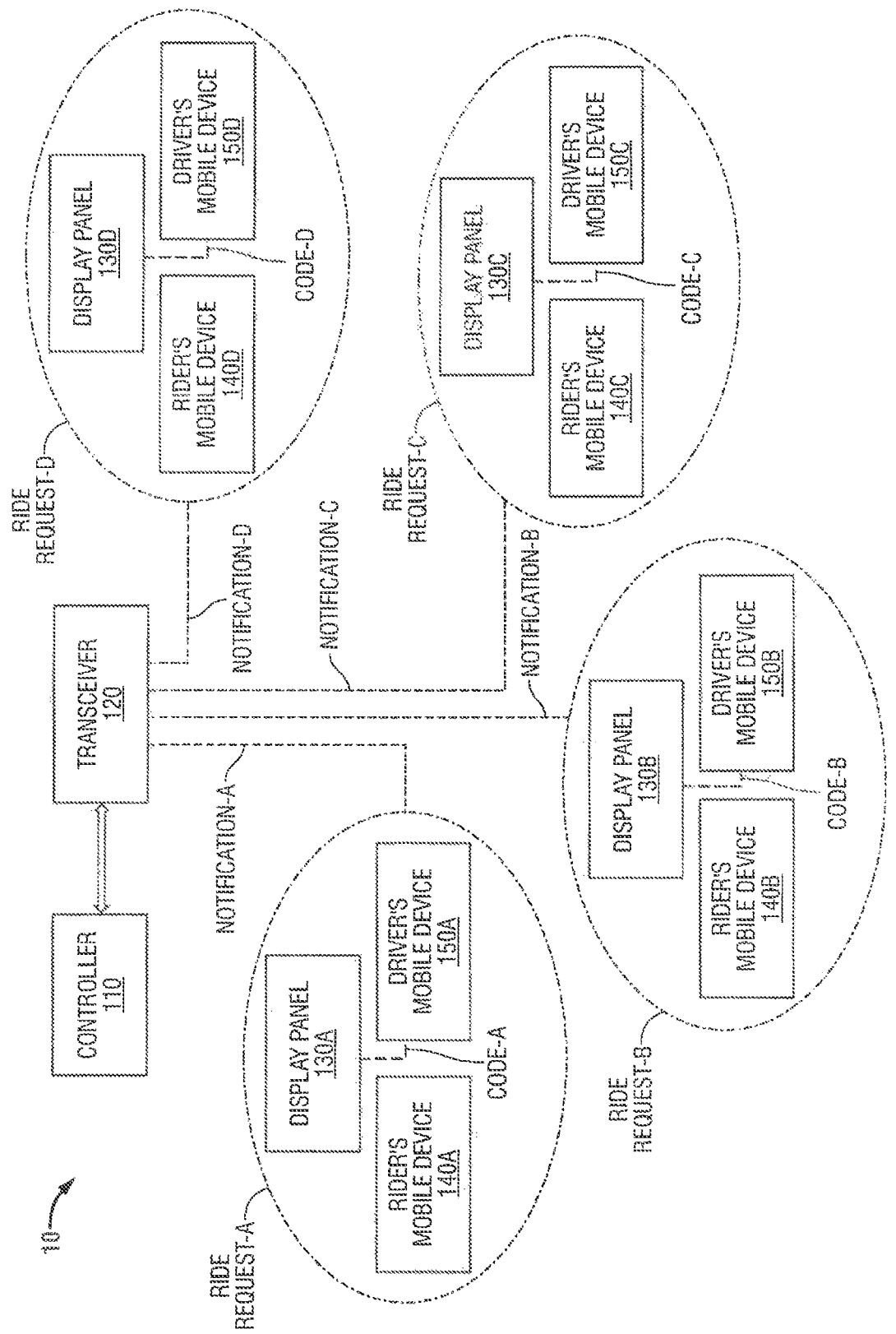
FIG. 2 is schematic illustration of the system for vehicle identification of FIG. 1A servicing multiple riders in accordance with an embodiment of the present disclosure.

As seen in FIG. 2, in response to receiving the NOTIFICATION-A the first DRIVER'S MOBILE DEVICE 150A transmits an indicatory signal CODE-A to the DISPLAY PANEL 130A, in response to receiving the NOTIFICATION-B the second DRIVER'S MOBILE DEVICE 150B transmits an indicatory signal CODE-B to the DISPLAY PANEL 130B, in response to receiving the NOTIFICATION-C the third DRIVER'S MOBILE DEVICE 150C transmits an indicatory signal CODE-C to the DISPLAY PANEL 130C, and in response to receiving the NOTIFICATION-D the fourth DRIVER'S MOBILE DEVICE 150D transmits an indicatory signal CODE-D to the DISPLAY PANEL 130D.

In some embodiments, wherein the vehicle identification system 10 is utilized, the first RIDER'S MOBILE DEVICE 140A may receive the indicatory signal CODE-A from the first DRIVER'S MOBILE DEVICE 150A, the second RIDER'S MOBILE DEVICE 140B may receive the indicatory signal CODE-B from the second DRIVER'S MOBILE DEVICE 150B, the third RIDER'S MOBILE DEVICE 140C may receive the indicatory signal CODE-C from the third DRIVER'S MOBILE DEVICE 150C, and the fourth RIDER'S MOBILE DEVICE 110D may receive the indicatory signal CODE-D from the fourth DRIVER'S MOBILE DEVICE 150D. In other embodiments, wherein the vehicle identification system 11 is utilized, an indicatory signal to the rider's mobile communication device may be generated by the controller 110.

Figure 3:
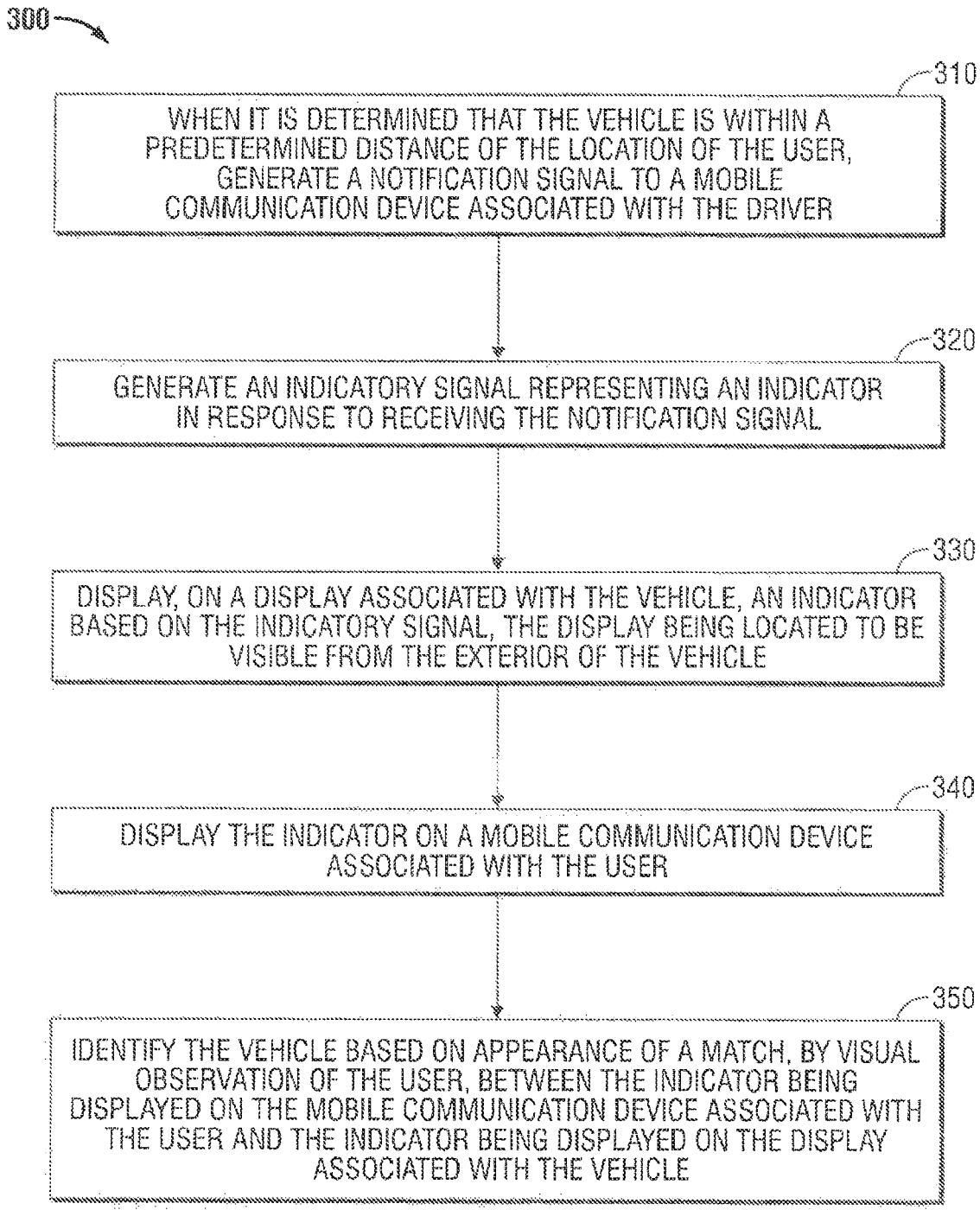
FIG. 3 is a flowchart illustrating an exemplary method of identifying a vehicle in accordance with an embodiment of the present disclosure.

FIG. 3 shows a flowchart illustrating a method of identifying a vehicle being dispatched to a location of a user having requested a ride from a transportation service in accordance with an embodiment of the present disclosure. At block 310, when it is determined that the vehicle 20 is within a predetermined distance of the location of the user P, a notification signal 15 is generated to a mobile communication device 150 associated with the driver D.

At block 320, an indicatory signal 17 representing an indicator 111 is generated in response to receiving the notification signal 15. However, it should be readily understood that the identifier 111 may generated by the controller 110 at any time after the controller receives a signal associated with a ride request.

At block 330, an indicator 111 based on the indicatory signal 17 is displayed on a display 130 associated with the vehicle 20. The display 130, 131 is located to be visible on the exterior of the vehicle 20, At block 340, the indicator 111 is displayed on a mobile communication device 140 associated with the user P.

At block 350, the vehicle 20 is identified based on appearance of a match, by visual observation of the user P, between the indicator 111 being displayed on the mobile communication device 140 associated with the user P and the indicator 111 being displayed on the display 130, 131 associated with the vehicle 20.

In an alternative aspect of the present disclosure, the controller 110 may transmit the indicatory signal signals 14 and/or 15 in an encrypted or coded manner to add a further level of security.

In a further alternative aspect of the present disclosure, an advantageous additional level of security to the rider, i.e., user P, and driver D may also be added by the method 300 by including a further step in which, for example, the notification signal (indicating that the vehicle and rider are at the pickup location) is generated by either of the mobile communication device of the rider 140 or the mobile communication device of the vehicle 150, and transmitted to the controller 110 based on receiving information from the other of the mobile communication devices 150 or 140, wherein the received information is indicative of the identifier. Such additional step advantageously provides a means of dual verification of the driver D and user P. In one exemplary embodiment, the mobile communication device 140 or 150 receiving the information from the other mobile communication device 150 or 140 by sensing an image using, for example, a camera of the receiving mobile communication device 140 or 150 to sense a produced image (indicative of the identifier) on a display of the other mobile communication device 150 or 140. Such produced image may be the identifier, or a code representing the identifier such as, for example, a bar code or quick response (QR) code.

In response to receiving the notification signal containing identifier information from the mobile communications devices 140 and 150, the controller 110 may process such identifier information to verify that the rider P has found the proper and intended vehicle 20. If the result of such processing provides such verification, the controller may transmit a verification signal to at least one of the mobile communications devices 140 and 150. In addition, in response to receipt of such a verification signal, the mobile communication devices 150 may transmits a signal to the display 131 to provide an indication to the rider and driver that rider have been verified. Such indication provided by the display 131 may be, for example, a change in a displayed images, generated sound, e.g., ringing sound, music or voice message, or the illumination of lights associated with the display 131. It should be readily understood that alternatively the mobile communication device 140 or 150 receiving the information from the other mobile communication device 150 or 140 may process such information to perform the verification instead of the controller 110, and then communicate whether verification was successful to the controller 110.

In another exemplary embodiment of the present disclosure providing dual verification, the mobile communication device 140 or 150 receiving the information (indicative of the identifier) from the other mobile communication device 150 or 140 receives such information in the form of a signal, such as an electrical or optical signal, transmitted by such other mobile communication device 150 or 140. Suitable signals for use in such embodiment include, for example, signals compliant with Bluetooth®, Wi-Fi, Near Field Communication and Zigbee wireless communication standards. In yet another exemplary embodiment, the rider's mobile communication device 140 transmits the notification signal further based on receiving additional information associated with the vehicle 20 by, for example, detecting a code, such as a bar code or QR code, disposed within the vehicle 20 with the controller 110 confirming that the detected vehicle code corresponds to the indicator associated with correct ride request. Upon receiving the notification signal that the vehicle 20 and rider (user P) are at the pickup location containing the received information, the controller 110 may process such information to verify that the rider (user P) has located or entered the correct vehicle 20, and transmit an associated verification signal.

In yet another exemplary embodiment of the present disclosure, the vehicle identification system 10, 11 may be advantageously operated to support the display of advertisements via the one or more displays 130 that are provided on the motor vehicle 20. In accordance with the positioning of the displays 130, ads are thereby presented to enable viewing by primarily by individuals located externally to the vehicle 20 (for example, on a sidewalk adjacent to a street on which the vehicle 20 is parked, moving or stopped at a stop sign).

Figure 4:
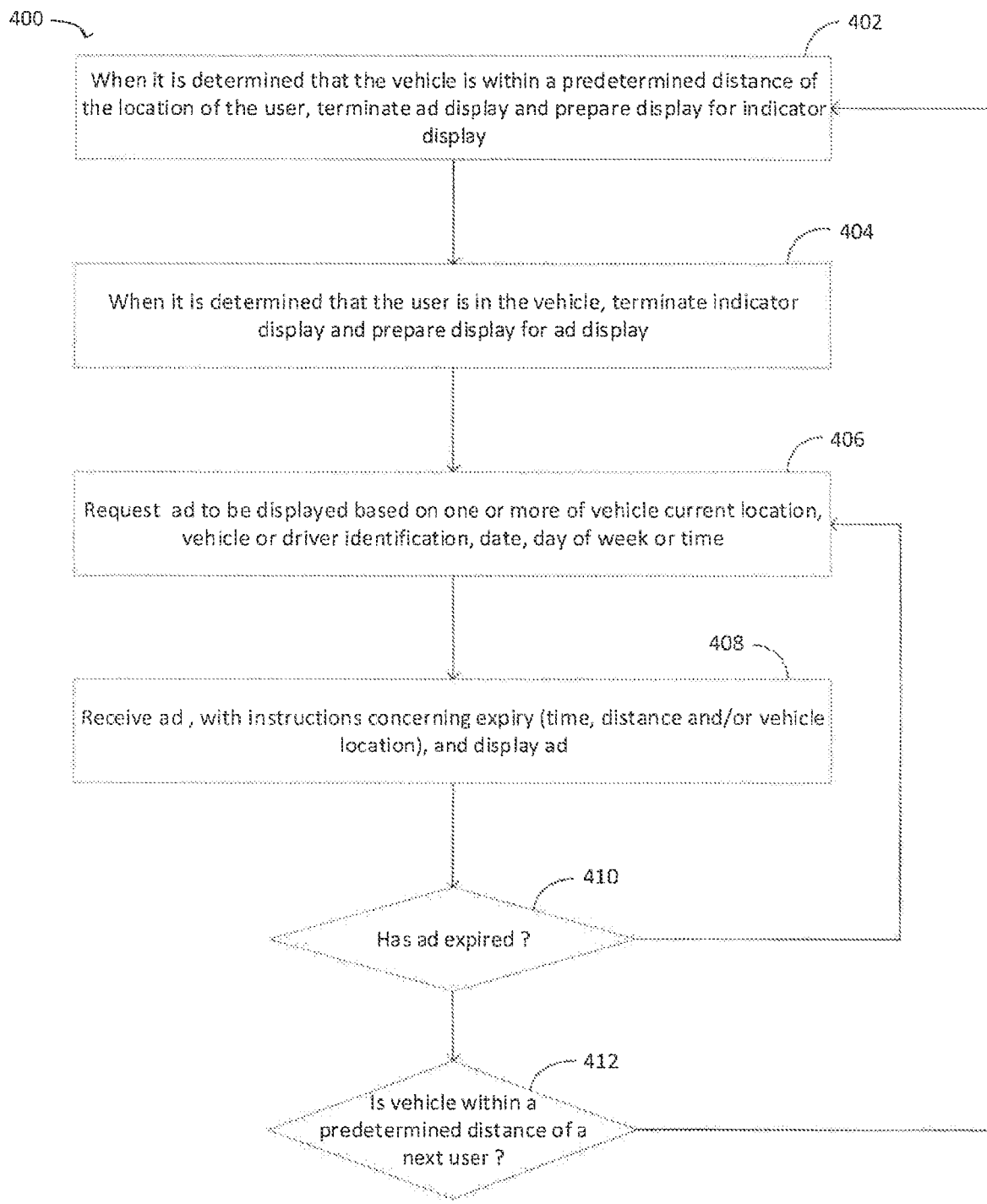
FIG. 4 is a flowchart illustrating an exemplary method of displaying advertising in a vehicle in accordance with an embodiment of the present disclosure.

By way of example, FIG. 4 presents a flowchart illustrating one method for displaying one or more ads on one or more of the displays 130, in such manner to avoid interference or conflict with embodiments of the present disclosure directed to identify a vehicle 20 to a user once the vehicle 20 reaches a user location.

The method depicted in FIG. 4 may, for example, be performed by the driver's mobile device 150 in combination with the one or more of the displays 130. The ad request of block 406 may be directed by the mobile device 150 via the transceiver 120 to the controller 110, or alternatively to an ad server in communication with the transceiver 120. Alternatively, the ad request may be directed to the controller 110 and forwarded to an ad server in communication with the transceiver 120 or an alternate transceiver in communications with the driver's mobile device 150. In this case, the controller 110 may preferably in addition transmit a confirmatory signal to the driver's mobile device 150 to indicate that the request has been forwarded. At block 408, the controller 110 or alternative ad server may then direct an ad to be transmitted to the driver's mobile device 150 in response to receiving the ad request of block 406.

As depicted at block 402 in FIG. 4, and with reference to block 310 of FIG. 3, when it is determined that the vehicle 20 is within a predetermined distance of the user location, and ad display that may be provided on one or more of the displays 130 is terminated, and that display 130 is prepared fen displaying the indicator 111 displayed at block 330 of FIG. 3.

When it is determined at block 404 of FIG. 4 that the user has arrived at the vehicle 20 (and, for example, has been seated within the vehicle 20), the display of the indicator 111 may be terminated so that the display 130 may be prepared for an ad display.

At block 406, an ad request is prepared and transmitted, for example, by the mobile device 150 via the transceiver 120 to the controller 110, or alternatively to the ad server in communication with the transceiver 120. The request may be initiated automatically by the device 150, or alternatively be manually initiated by the driver of the vehicle 120. The request may preferably include or otherwise reference selection information to be used by an ad service to select and provide an ad for display. For example, selection information may include one or more of a current vehicle location, vehicle destination, vehicle identification, driver identification, date, day of week, or time of day. This information may preferably be obtained and or stored by the application on the driver's mobile device 150, for example, in conjunction with one or more of a native Global Positioning System (GPS) application and calendar and clock applications of the device 150.

In response to the ad request and associated selection information, the ad service may proceed to select an ad for display and transmit the ad via the transceiver 120 at block 408 for receipt by the driver's mobile device 150 and display by at least one of the one or more displays 130. Assisted by the selection information, the ad service may select the ad, for example, based upon the entry of the vehicle into a current or destinational geographic area (for example, a geofence) assigned to a target advertiser, on an estimated time duration of the ride, and/or traditional ad campaign metrics (for example, including a cumulative number of showings overall or for the vehicle or driver). The ad transmitted via the transmitter 120 may also preferably include information concerning its intended display. For example, this information may include instructions for starting and concluding the ad display as a function of time, distance and/or a current vehicle location.

Alternatively, in accordance with aspects of the present disclosure, the ad service as administered by the controller 110 or other ad server may proceed to deliver an ad to the driver's mobile device 150 automatically and without receiving an ad request. In this case, a current location of the vehicle is continuously tracked (for example by the controller 110), and an ad for delivery to the vehicle may be selected, for example, from an ad queue and as a function of the current location of the vehicle. In addition to ads that are selected according to a local presence of the advertiser (for example, ads that are geo-fenced), ads may be provided for advertisers and products that have a nationwide or otherwise broad notoriety and appeal. Ads may be queued, for example, to achieve a contractual agreement for a certain number of plays in certain geographic regions over a certain period of time. In addition to providing single ads, a group of ads may be delivered by the controller 110 or ad server to the vehicle at the same time serial display.

Figure 5:
FIG. 5 depicts an exemplary advertisement for display in accordance with the method of FIG. 4.

FIG. 5 depicts an exemplary ad for display on the one or more displays 130. As depicted, for example, the ad presents a logo of the advertiser ("DUNKIN DONUTS") and a proportional code to be used by a user in redeeming a benefit from the advertiser (for example, a purchase discount of 15%, or a free donut). The promotional code may preferably be used to identify one or more of the driver, the vehicle or the transportation service as a means for the advertiser to gauge the effectiveness of the ad.

At block 410, the application on the driver's mobile device 150 preferably monitors the ad display in view of the instructions. If it is determined that the ad has expired in accordance with the instructions, the device 150 returns to block 406 to prepare another ad request for transmission to the controller 110 or ad server. Alternatively, the initial request at block 406 may have included a request for at least a second ad, which may have been transmitted to the device 150 with the first ad at original block 408.

At block 412, the driver's mobile device 150 preferably monitors whether the vehicle 20 has traveled to within a predetermined distance of a location of a next user, and if so, returns to block 402 to terminate the ad on the one or more of displays 130 and prepare the displays 130 for displaying the indicator 111 displayed at block 330 of FIG. 3. At the conclusion of the ride, or alternatively at the expiry of each ad, the driver's mobile device preferably transmits a confirmatory signal to the controller 110 or ad server via the transceiver 120 to confirm that the requested ad was displayed. The confirmatory signal may preferably include summary display information for displayed ad including, for example, actual time of display, route and distance information, and/or the like.

In a further alternative aspect of the present disclosure, the controller 110 transmits a display control signal to the mobile communication device of the vehicle 150 to further communicate with the display 131 to cause the display to display at least one message, other than the indicator, stored in a memory associated with the display 131 or the mobile communication device 150. Such message may, for example, be an alert message such as a medical emergency or safety message. In addition, such display control signal may control the display 131 to alternatively display for predetermined periods of time the indicator and other messages such as, for example, stored in a memory associated with the display 131 or the mobile communication device 150.

In a still further alternative aspect of the present disclosure, the controller receives a requested identifier from either of the mobile communication devices 140 and 150, and confirms that the requested identifier is unique for a geographic region proximate the pickup location at a predetermined time, and then communicates such confirmed requested identifier to the other of the mobile communication devices 150 and 140. If such requested identifier is not unique for at least one of the geographic region proximate the pickup location or a predetermined time period, the controller 110 then creates a unique identifier for the geographic region proximate the pickup location at a predetermined time.

Although embodiments have been described in detail with reference to the accompanying drawings for the purpose of illustration and description, it is to be understood that the disclosed systems and processes are not to be construed as limited thereby. It will be apparent to those of ordinary skill in the art that various modifications to the foregoing embodiments may be made without departing from the scope of the disclosure.

What is claimed is:

1. A computer-implemented method for a ride share service controller, comprising the steps of:
   receiving from a mobile communication device a signal indicative of a ride request for a rider;
   identifying a mobile communication device associated with a vehicle selected for responding to the ride request;
   generating an identifier for the ride request, the identifier being unique for a geographic region proximate a pickup location of the ride request;
   transmitting a first signal representing the identifier to the mobile communication device associated with the vehicle for displaying the identifier on one or more displays visible from an exterior of the vehicle;
   transmitting a second signal representing the identifier to the mobile communication device associated with the rider;
   receiving a notification signal from at least one of the mobile communication devices associated with the vehicle or rider that the vehicle and rider are at the pickup location;
   receiving an ad request signal from the mobile communication device associated with the vehicle; and
   transmitting a response signal in response to the ad request signal.

2. The computer-implemented method of claim 1, wherein the response signal is transmitted to the mobile communication device associated with the vehicle and comprises an advertisement for display on at least one of the displays visible from the exterior of the vehicle.

3. The computer-implemented method of claim 1, wherein the response signal further comprises instructional information for displaying the advertisement on at least one of the displays visible from the exterior of the vehicle.

4. The computer-implemented method of claim 2, wherein the response signal is transmitted by an ad server.

5. The computer-implemented method of claim 4, wherein the advertisement is selected from an ad queue on the ad server.

6. The computer-implemented method of claim 4, further comprising the step of:
   transmitting a confirmatory signal from the mobile communications device associated with the vehicle to the ad server to confirm the advertisement was displayed on at least one of the displays visible from the exterior of the vehicle.

7. The computer implemented method of claim 5, wherein the confirmatory signal further includes summary display information for the advertisement.

8. The computer-implemented method of claim 1, wherein the mobile communication device associated with the vehicle is a mobile communication device associated with a driver of the vehicle.

9. The computer-implemented method of claim 1, wherein the identifier is in the form of an alphanumeric string.

10. The computer-implemented method of claim 1, wherein the identifier is in the form other than an alphanumeric string.

11. The computer-implemented method of claim 2, further comprising the step of:
    determining a destination location of the vehicle and displaying the advertisement based upon the destination location of the vehicle.

12. The computer-implemented method of claim 2, further comprising the step of:
    determining a current location of the vehicle and displaying the advertisement based upon the current location of the vehicle.

13. The computer-implemented method of claim 2, wherein the advertisement includes a promotional code.

14. A computer-implemented method for a ride share service controller, comprising the steps of:
    receiving from a mobile communication device a signal indicative of a ride request for a rider;
    identifying a mobile communication device associated with a vehicle selected for responding to the request;
    generating an identifier for the ride request, the identifier being unique for a geographic region proximate a pickup location of the ride request during a period of time;
    terminating displaying of an advertisement being displayed on one or more displays visible from an exterior of the vehicle;
    transmitting a first signal representing the identifier to the mobile communication device associated with the vehicle for displaying the indicator on at least one of the displays visible from an exterior of the vehicle;
    transmitting a second signal representing the identifier to the mobile communication device associated with the rider;
    receiving at least one notification signal from at least one of the mobile communication devices associated with the vehicle or rider containing information indicative that the rider has found the vehicle;
    processing the information to verify that the rider has found the vehicle; and
    transmitting a third signal to the mobile communication device associated with the vehicle, wherein the third signal comprises an ad signal for displaying an advertisement on at least one of the displays visible from an exterior of the vehicle.

15. The computer-implemented method of claim 14, further comprising the step of:
    determining a destination location of the vehicle and displaying the advertisement based upon the destination location of the vehicle.

16. The computer-implemented method of claim 14, further comprising the step of:
    determining a current location of the vehicle and displaying the advertisement based upon the current location of the vehicle.

17. The computer-implemented method of claim 14, wherein the advertisement is selected from an ad queue on an ad server.

18. The computer-implemented method of claim 14, wherein the mobile communication device associated with the vehicle is a mobile communication device associated with a driver of the vehicle.

19. The computer-implemented method of claim 14, wherein the identifier is in the form of an alphanumeric string.

20. The computer-implemented method of claim 14, wherein the identifier is in the form other than an alphanumeric string.

* * * * *